Patented June 19, 1923.

1,458,993

UNITED STATES PATENT OFFICE.

WALTER T. SCHEELE, OF HACKENSACK, NEW JERSEY, ASSIGNOR TO H. MORTIMER SPECHT, OF NEW YORK, N. Y.

PRODUCTION OF CAMPHOR.

No Drawing. Original application filed November 24, 1920, Serial No. 426,131. Divided and this application filed March 30, 1921. Serial No. 457,035.

*To all whom it may concern:*

Be it known that WALTER T. SCHEELE, a citizen of Germany, residing at Hackensack, in the county of Bergen and State of New Jersey, has invented certain new and useful Improvements in the Production of Camphor, of which the following is a specification.

This application is a divisional application from my United States patent application, Serial No. 426,131, filed November 24th, 1920.

The present invention relates to the production of camphor from camphoric acid and has for its object to provide an improved process whereby such conversion may be effected by a direct process and more expeditiously and cheaply than heretofore.

I have found that the reduction of camphoric acid to camphor can be readily effected by the action of readily oxidizable metals in finely divided form. In order that effective contact may be obtained between the reacting substances the camphor is dissolved in a suitable solvent and finely divided metal is mixed with the solution. The size of the metallic particles depends on the nature of the metal. The best form of metal is that which has been reduced from combined form whereby the metal is obtained in extremely finely divided condition. The metal thus obtained is in extremely finely divided form and gives satisfactory results in the present process. The finely divided material sold under the name "ferrum hydrogenio reductum" may also be used.

The camphoric acid is treated in solution. Any solvent of camphor may be used provided that it be inert to the reactive materials under conditions of reaction.

In order to illustrate the operation of the process, the following example is given, but it is to be understood that the invention is not limited thereto.

The camphoric acid is dissolved in ethyl alcohol and the solution heated to 50° C. Finely divided iron is added and the whole maintained at 50° C. for about 15 to 20 minutes or longer. The solution is then filtered from residual iron and the camphor is precipitated by admixture with water collected, melted and cast into suitable form.

The reduction of camphoric acid may also be effected in similar manner by use of powdered tin, copper or aluminum or other readily oxidizable metals.

I claim:—

1. The method of reducing camphoric acid to camphor which consists of treating the camphoric acid with a finely divided readily oxidizable metal.

2. The method of reducing camphoric acid to camphor which consists of treating a solution of camphoric acid with a finely divided readily oxidizable metal.

3. The method of reducing camphoric acid to camphor which consists of treating a solution of camphoric acid in alcohol with a finely divided readily oxidizable metal.

4. The method of reducing camphoric acid to camphor which consists of treating camphoric acid with finely divided iron.

5. The method of reducing camphoric acid to camphor which consists of treating camphoric acid with "ferrum hydrogenio reductum."

6. The method of reducing camphoric acid to camphor which consists of treating a solution of camphoric acid with finely divided iron.

7. The method of reducing camphoric acid to camphor which consists of treating a solution of camphoric acid with "ferrum hydrogenio reductum."

8. The method of reducing camphoric acid to camphor which consists of treating a solution of camphor in alcohol with finely divided iron.

9. The method of reducing camphoric acid to camphor which consists of treating a solution of camphoric acid in alcohol with "ferrum hydrogenio reductum."

In testimony whereof I affix my signature.

WALTER T. SCHEELE.